INVENTOR
Alfred D. Johnson
BY
ATTORNEY

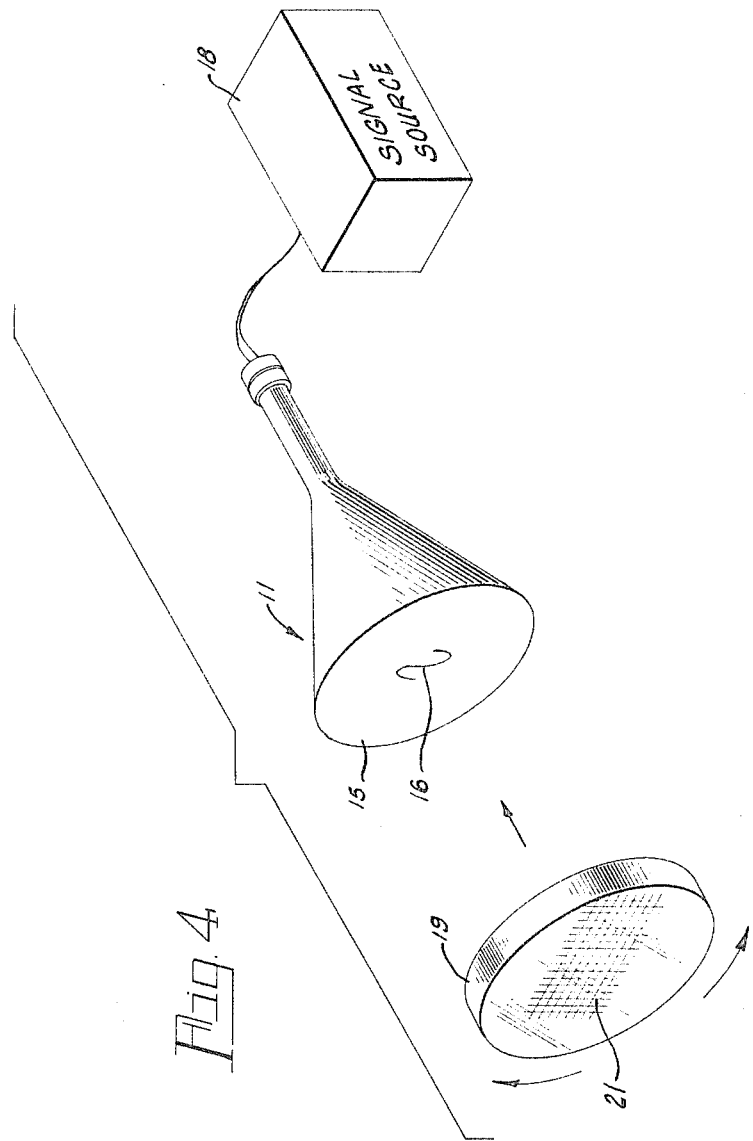

United States Patent Office 3,274,421
Patented Sept. 20, 1966

3,274,421
READ-OUT DEVICE HAVING BONDING MATERIAL BETWEEN A FACE PANEL AND A COVER PANEL
Alfred D. Johnson, Seneca Falls, N.Y., assignor to Sylvania Electric Products Inc., a corporation of Delaware
Filed Dec. 26, 1961, Ser. No. 162,052
3 Claims. (Cl. 313—109.5)

This invention relates to read-out devices and more particularly to cathode ray tubes having improved laminated viewing structures.

In the usage of cathode ray tubes for electronic image display purposes, such as in oscilloscopes and like, several pellucid plates have been usually superimposed over the viewing area of the tube for the purposes of light filtering and graphic comparison of display imagery. The outermost plate was generally of a plastic material having a graticule scribed on it. Being of soft material, this outer plate was particularly susceptible to scratching and static dust adherence. The light filter medium used to accentuate the display imagery was usually of an easily abraded transparent material. Since the filter, graticule, and face plates were often of dissimilar materials, there were apt to be variations in the indices of refraction which affected light transmission and introduced degrees of parallax distortion to viewing. Image contrast was reduced by the presence of multiple reflections from the several surfaces through which the display light output had to travel. Even though the several plates were adjacent one another, dust and dirt accumulated therebetween and produced a condition which necessitated frequent cleaning with resultant annoying surface abrasions.

Accordingly, it is an object of the invention to reduce the aforementioned disadvantages by providing an improved read-out device having enhanced viewing characteristics as well as long life low maintenance capabilities.

Another object is to protect the graticule of a readout device from abrasion and dust.

An additional object is to enhance image contrast by reducing the number of ambient light reflective surfaces and by attenuating reflected ambient light.

A further object is to optically intensify the graticule in order to improve the visual observation qualities thereof relative to the display image.

The foregoing object, as well as other objects which will become apparent after reading the following description, are achieved in one aspect of the invention by providing a cathode ray tube or similar read-out device having a pellucid cover panel with a graticule scribed on the inner surface thereof properly oriented and aligned with the axis of the display imagery and fixedly attached or bonded to the face panel of the device. A light filter medium may be included in the resinous bonding therebetween or incorporated as an addition to the cover panel material. The bonded laminae panels form an integrated viewing area, the cover panel, of which has an edge structure conducive to the lateral admittance of light from an external source to accentuate the grating lines placed thereon.

For a better understanding of the present invention, together with other and further objects, advantages, and capabilities thereof, reference is made to the following disclosure and appended claims in connection with the accompanying drawings in which:

FIG. 4 is a simplified exploded perspective illustration of the graticule alignment technique.

Figure 1:
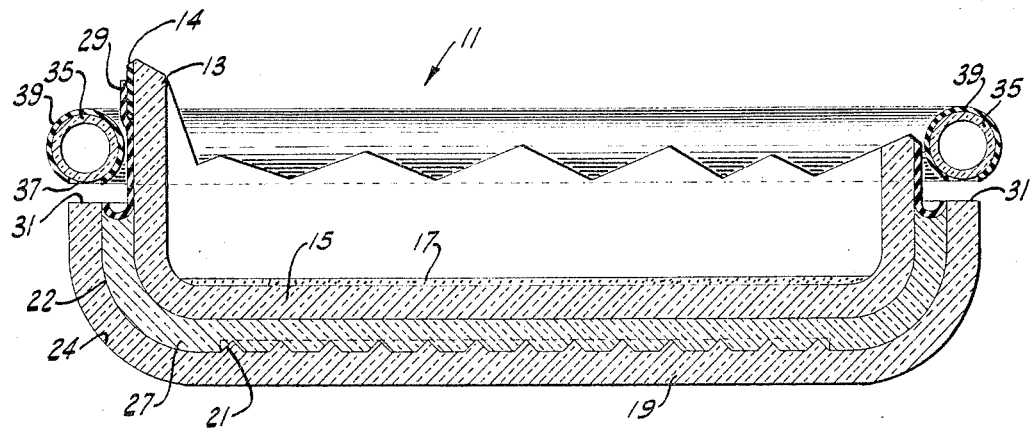
FIG. 1 is a partial plan view of the laminated viewing area of a cathode ray tube.

Referring to FIG. 1, the cut-away section of a cathode ray tube 11 shows a portion of the envelope 13 having a substantially planar transparent viewing area or face panel 15 such as of glass. The inner surface of the face panel is coated with suitable phospors 17 capable of producing a luminescent image when bombarded by electrons emitted from the cathode ray tube electron gun structure, not shown.

As shown in FIG. 1, there is positioned in front of the face panel 15, being spaced therefrom and bonded thereto, a substantially limpid cover panel 19 as of glass having a flanged edge contoured to spacedly cup the facial rim of the cathode ray tube 11. This cover panel has a permanent grating, hereinafter referred to as a graticule 21, on its inner surface. This graticule affords a graphical means for comparative evaluation of the display imagery when viewed therethrough. The mesh of the graticule is chosen in accordance with the intended application. As related to the inner surface of the cover panel 19, the graticule 21, as shown, is slightly raised above the inner surface and affixed as a part thereof by molding or embossing by fused ceramic frit or paint.

Figure 2:
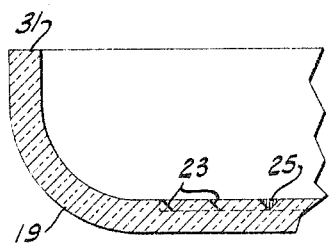
FIG. 2 is a plan view of a cover panel showing a graticule inscribed into the inner surface thereof.

Another way of placing the graticule on the inner surface of the cover panel 19 is illustrated in FIG. 2 wherein the graticule 23 is mechanically scribed or engraved, abrasively or chemically etched, or molded into the inner surface of the cover panel 19. The resultant indentations may be inlaid with pigmented material 25 to visually accentuate the graticule. An alternate means for providing an internal cover panel graticule would employ the use of photosenitive glass. A cover panel of such material could, if desired, exhibit internal etching deeper than that shown in FIGS. 2 and 3.

As previously mentioned, cover panel 19 is axially oriented and held in spaced relationship with cathode ray tube face panel 15. This is accomplished as shown in FIG. 4 wherein cathode ray tube 11 is operationally supplied with a predetermined test signal from an external source 18. This signal is projected by the tube electron gun onto the phosphorized inner surface of face panel 15 thereby producing a visual image display pattern 16 of the translated signal. The cover panel 19, having a graticule 21 on its inner face, which is the surface nearest the face panel 15, is axially positioned adjacent to face panel 15 and oriented by rotation so that the axis of the graticule is properly aligned with the axis of the display image 16. There is sufficient spacing between juxtapositioned face panel 15 and cover panel 19 to accommodate adequate bonding. This interpanel spacing is then filled with a clear liquid resinous material 27 which hardens by polymerization into a transparent bonding medium which has essentially the same index of refraction as that of the panels joined. Thus a laminated viewing structure has integrated components exhibiting similar optical characteristics.

To shield the edge or border of the bonding material 27 and the face panel 15 from edgewise ambient light, an opaque coating mask 29 as suitable plastic or paint is applied to the exposed edge of the bonding material 27 and extends to overlap the external opaque coating 14 on the cathode ray tube envelope 13.

The exposed edge 31 of cover panel 19 is clear to facilitate the lateral admittance of external light from source 35 through opening 37 in light shield 39 which surrounds the light source 35. This light source may be a fluorescent or incandescent lamp substantially formed to achieve the perimetric contour of the cover panel 19. A series of individual lamps may also be utilized to provide suitable edge illumination. Light rays enter the exposed edge 31 of cover panel 19 in a manner known as edge lighting wherein the beam of light laterally traverses the cover panel 19 by internal reflection between the parallel planar exterior surfaces 22 and 24. Upon striking the altered surface of the graticuled area the internally reflected light rays are diffused thereby visibly accentuating the graticule 21 in contrast with the generalized viewing area.

A light filtering effect to improve image contrast by reducing the amount of ambient light that is reflected back through the panelized structure is accomplished by subduing the light transmission characteristic of one or more of the panelized structures through which reflected ambient light must pass. One means for achieving this end is by the addition of a light filtering material such as an optical dye to the liquid bonding resin before it is introduced into the interpanel spacing as has been previously set forth.

Figure 3:
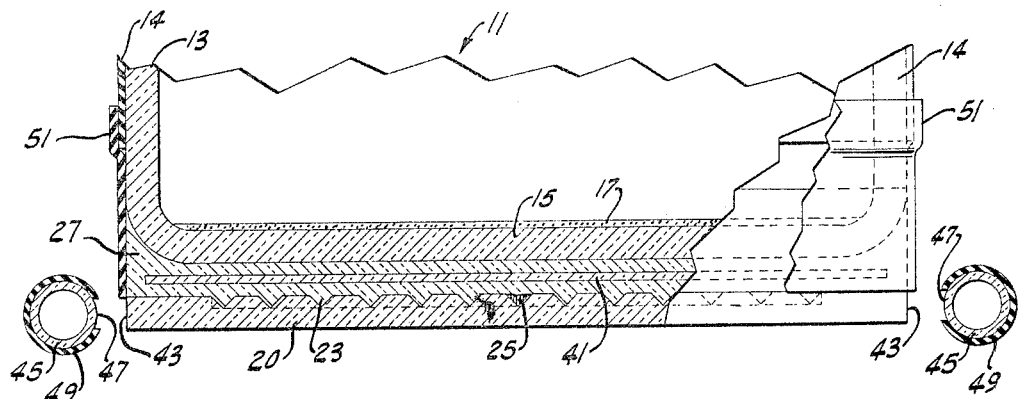
FIG. 3 is a plan view of another laminated viewing structure showing the addition of a light filter means.

An alternate means for supplying a light filtering medium is shown in FIG. 3 wherein there is illustrated a panelized structure basically similar to that shown in FIG. 1 with the exception that the cover panel 20 is substantially flat and of an area approximately that of the cathode ray tube face panel 15. This flat panel structure allows for the placement of a filter means 41 in the interpanel spacing between the face panel 15 and the cover panel 20 so that the filter means is spacedly oriented between the panels and fixedly positioned by the introduction of the liquid bonding resin 27 on either side thereof.

If desired, suitable light filtering material can be incorporated into the glass composition of the cathode ray tube face panel 15 or the cover panels 19 and 20 at the time of manufacture thereby eliminating the need for separate light filtering means.

Cover panel 20 may contain a graticule 23 as shown in FIG. 3 or a graticule 21 as portrayed in FIG. 1. Light masking 51 has a function similar to masking 29 in FIG. 1.

The exposed edge 43 of panel 20 is clear to facilitate the lateral admittance of external light from source 45 through opening 47 in light shield 49 which surrounds light source 45. Internal reflection within cover panel 20 is as previously explained for cover panel 19.

While flat or planar panels are shown and described, it is evident that curvilinear face and cover panels may be likewise employed.

In some operational environments the presence of stray fields may cause slight misalignment of the dynamic pattern display with the fixed graticule. This misalignment can be corrected by appropriate means such as a pattern alignment coil mounted exterior of the tube to encircle the region adjacent the face panel.

Thus there is provided an improved read-out device employing a cathode ray tube having a laminated viewing area containing a light filter medium and a protected graticule integrated with the inner surface of the cover panel and fixedly oriented relative to the tube display image. The oriented graticule forms a static display in a manner to be enhanced by edge lighting of the cover panel. Being fixedly juxtapositioned in a plane substantially parallel with the face panel, the static graticule display can be directly compared with the dynamic display image evidenced therethrough on the phosphorized face panel. Thus, the laminated viewing structure, while being permanently and optically aligned, is sealed against dust or dirt penetration thereby affording an integrated structure realizing advantages not heretofore possible.

While there has been shown and described what is at present considered the preferred embodiment of the invention, it will be obvious to those skilled in the art that various changes and modifications may be made therein without departing from the invention as defined by the appended claims.

What is claimed is:

1. A read-out device having a laminated viewing area comprising a substantially transparent face panel having a given index of refraction for providing a display, a substantially transparent cover panel for said face panel having an index of refraction substantially corresponding to that of said face panel, said cover panel having a graticule formed on the internal surface for observation from the external surface thereof, a substantially transparent bonding material having an index of refraction substantially corresponding to that of said panels and disposed intermediate said panels, said bonding material supporting said panels relative to one another in alignment to provide orientation of the graticuled cover panel with the axis of the face panel display to enable conjunctive comparison of the graticule and the display image during external viewing.

2. A read-out device having a laminated viewing area comprising a substantially transparent face panel having a given index of refraction for providing a display, a substantially transparent cover panel for said face panel having an index of refraction substantially corresponding to that of said face panel, said cover panel having a graticule formed on the internal surface for observation from the external surface thereof and for interception of light rays transmitted laterally thereto, said cover panel having an edge structure formed for the admittance of external light and for the transmission of said light to said graticule, a substantially transparent bonding material having an index of refraction substantially corresponding to that of said panels and disposed intermediate said panels, said bonding material supporting said panels relative to one another in alignment to provide orientation of the graticuled cover panel with the axis of the face panel display to enable conjunctive comparison of the graticule and the display image during external viewing.

3. A read-out device having a laminated viewing area comprising a substantially transparent face panel having a given index of refraction for providing a display, a substantially transparent cover panel for said face panel having an index of refraction substantially corresponding to that of said face panel, said cover panel having a graticule formed on the internal surface for observation from the external surface thereof and for interception of light rays transmitted laterally thereto, said cover panel having an edge structure for the admittance of external light and for the transmission of said light to said graticule, a substantially transparent bonding material incorporating a light filtering means having an index of refraction substantially corresponding to that of said panels and disposed intermediate said panels, said bonding material supporting said panels relative to one another in alignment to provide orientation of the graticuled cover panel with the axis of the face panel display to enable conjunctive comparison of the graticule and the display image during external viewing.

References Cited by the Examiner

UNITED STATES PATENTS

| | | | |
|---|---|---|---|
| 2,330,604 | 9/1943 | Messner | 178—7.84 |
| 2,446,674 | 8/1948 | Sproul | 178—7.4 |
| 2,453,194 | 11/1948 | Buzzell | 313—112 |
| 2,706,262 | 4/1955 | Barnes | 313—112 |
| 2,734,142 | 2/1956 | Barnes | 313—112 |
| 2,819,458 | 1/1958 | Bang | 178—7.84 |

HERMAN KARL SAALBACH, *Primary Examiner.*

ARTHUR GAUSS, *Examiner.*

S. CHATMON, JR., *Assistant Examiner.*